Dec. 2, 1958     G. R. CLIFT ET AL     2,862,430
CAMERA LENS TURRET LOCKING DEVICE

Filed Aug. 5, 1955                          2 Sheets-Sheet 1

INVENTOR.
GORDON R. CLIFT
JEAN J. L. GODAT
BY
H. S. Mackey
ATTORNEY

Dec. 2, 1958 G. R. CLIFT ET AL 2,862,430
CAMERA LENS TURRET LOCKING DEVICE
Filed Aug. 5, 1955 2 Sheets-Sheet 2

INVENTOR.
GORDON R. CLIFT
JEAN J. L. GODAT
BY
*H. L. Mackey*
ATTORNEY

United States Patent Office 2,862,430
Patented Dec. 2, 1958

2,862,430
CAMERA LENS TURRET LOCKING DEVICE

Gordon R. Clift, Mount Kisco, and Jean J. L. Godat, Thornwood, N. Y., assignors to General Precision Laboratory Incorporated, a corporation of New York Application August 5, 1955, Serial No. 526,724

3 Claims. (Cl. 95—45)

This invention relates to cameras having a plurality of lenses mounted on a rotatable turret plate. More particularly the invention relates to devices for indexing and locking the turrets of television and motion picture cameras in position to use a selected lens.

When such cameras are remotely controlled the lens must be selected by electrical means which must include a positive lock in order to position and maintain the active lens in front of the camera aperture with great accuracy. This requires the use of mechanism to pull the lens into its exact position. The mechanism, having positioned the turret, must lock it rigidly to the main camera structure to obviate the possibility of any vibration or relative motion, however slight.

A wedge and slot mechanism may be employed as a turret lock. This mechanism consists of several tapered slots in the edge of the turret plate, one for each lens position, and a matching wedge associated with the camera frame which is driven into one of the slots to lock the turret in a selected position. The wedge and slot mechanism is unsatisfactory, however, because if the taper is made gradual enough to wedge positively, the wedge sticks and jams in the slot. The jamming is aggravated by temperature changes, and the device is completely impractical for use in apparatus required to operate between temperature limits of —55° C. and +55° C., as is often required of military equipment.

The present invention provides a locking device which is simple but which is completely free of the sticking characteristic of the wedge and slot even when subject to the most severe temperature changes. Furthermore, this locking device is power driven to highly precise indexed positions, and holds with great rigidity. It thus has all of the advantages of the wedge and slot but none of its faults. The present device has the further advantage over the wedge and slot that all of the indexing, locking and unlocking motions are rotary, the device having no reciprocating parts with the exception of electrical switch parts.

The device provides flattened pins on the turret. A fork or clevis is secured to the camera and may be rotated through one-quarter turn. This clevis is so arranged that in one of its positions the flattened pins pass freely through its slot when the turret is rotated. If, however, while a pin is within the slot the clevis be rotated to its other position, it embraces the pin to hold it securely, thus preventing rotation of the turret. Return of the clevis to its first position releases the pin and allows the turret to be rotated.

The principal purpose of this invention is to provide an improved turret locking device for lens turret cameras.

Another purpose of this invention is to provide a remotely controlled turret locking device for television and motion picture cameras.

Still another purpose is to provide a remotely controlled turret indexing and locking device which is operable between very wide temperature limits.

Still another purpose is to provide a remotely controlled turret rotating device with automatic indexing and locking.

Further understanding of this invention may be secured from the detailed description and associated drawings, in which:

Figure 8 is a schematic wiring diagram of the turret revolving, indexing and locking circuit.

Figure 1:
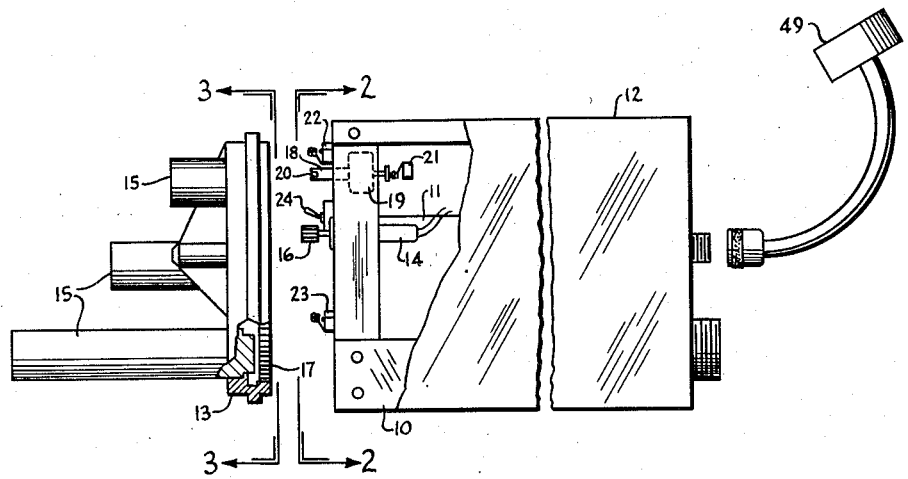
Figure 1 is a side view of a television camera, with the lens turret slightly separated from the remainder.

Referring now to Fig. 1, a television camera comprises a rectilinear frame 10 to which a camera tube 11, such as the image orthicon tube, and other parts are secured. The camera is surrounded by a protective case 12 which in the drawing is partly broken away to reveal the parts of interest. A lens turret 13 with lenses 15 and associated parts is separated slightly from the end of the camera on which it is assembled in order to reveal those camera parts including the driving motor and rotary solenoid which cooperate with the turret indexing and locking it. Although in this example, the turret has three lenses, it may alternatively have two, four, or more lenses with only minor and obvious changes in the design applying the invention.

An electric motor 14 having internal step-down gearing bears a pinion 16 on its output shaft which meshes with a turret internal ring gear 17 to rotate the turret. A round shaft 18 provided with a slot or clevis 20 in its free end is attached at its other end to a 90° rotary solenoid 19 which rotates the shaft 18 and also controls an electric switch 21. The camera contains three additional electric switches of the short travel snap type switches 22 and 23 being visible in Fig. 1. A reversing toggle switch 24 is also provided.

Figure 2:
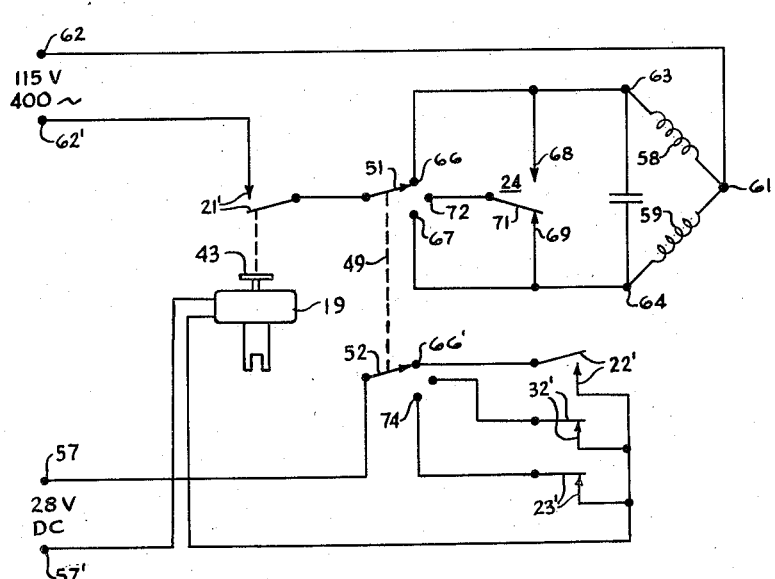
Figure 2 is an end view of the camera with turret removed taken on the line 2—2 of Fig. 1.
Figure 2:
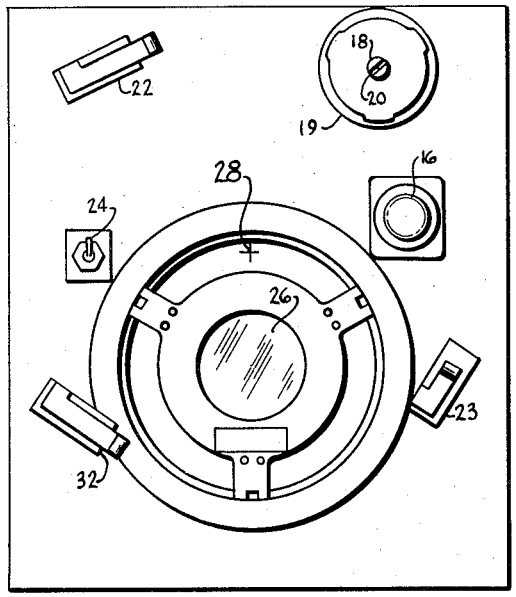
Figure 4:
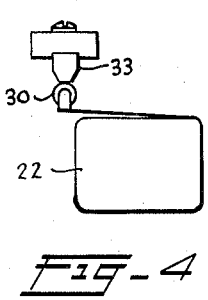
Figure 4 is an edge view of the turret plate, Fig. 3, taken on the line 4—4, showing the relation of a positioning switch to its actuating cam.
Figure 3:
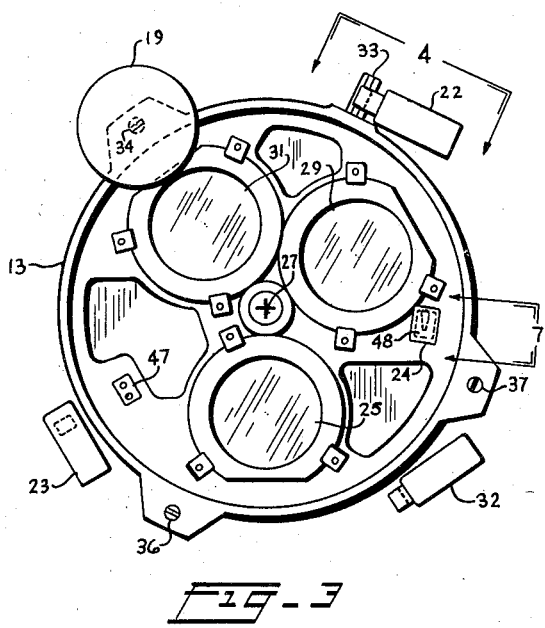
Figure 3 is a view of the camera turret taken on the line 3—3 of Fig. 1.

The mechanical positions and interrelations of these components are seen more clearly in Figs. 2 and 3. These two views fit together face to face so that the working lens position 25, Fig. 3, lies concentrically upon the light-receiving end 26, Fig. 2, of the camera tube. The turret center of rotation 27, Fig. 3, then lies upon the point 28, Fig. 2. Two more lens positions 29 and 31, Fig. 3, are equidistant from the center of rotation 27. The three snap switches 22, 23 and 32, Fig. 2, are arranged about the point 28 and at equal distances from it. These switches are also depicted in Fig. 3 superimposed upon the turret parts as they would be juxtaposed when the turret is assembled to the camera, this repetition of parts being utilized to facilitate description of operation. The snap switch 22, Fig. 3, is drawn superimposed on a projection 33 carried by the edge of turret plate 13. Projection 33 is carried around by the rotating turret plate to the positions of the switches 22, 23, and 32, so that at each position the projection serves as a cam operating the switch. The cam position relative to one of these switches is more easily seen in Fig. 4, which shows the roller 30 of switch 22 in contact with cam 33, operating the switch.

Figure 6:
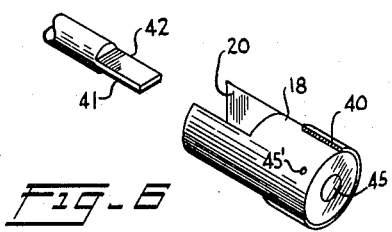
Figures 5 and 6 are exploded views of the clevis and flattened rod depicting their relations in the two positions of the clevis, and including a view of the solenoid microswitch exploded from its position.
Figure 5:
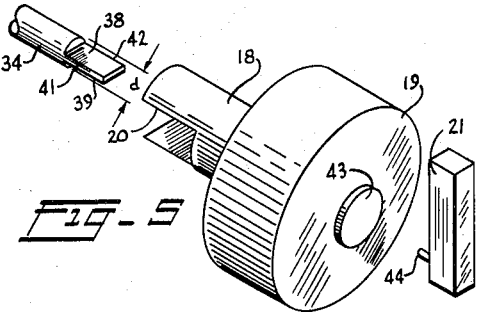

Three flattened round rods 34, 36 and 37, Fig. 3, are disposed at intervals and at equal radii around turret plate 13. These flattened rods cooperate with the clevis 20 of rod 18, Fig. 1, to form part of the turret locking device, the rotary solenoid 19 which rotates the clevis being shown in Fig. 3 superimposed upon one of the flattened rods. The interrelations of the clevis with one of the rods is more clearly seen in Figs. 5 and 6, together with the rotary solenoid 19 and snap switch 21. The rod 34, Fig. 5, has a diameter which is exactly equal to the width of the slot or clevis 20. The rod 34 is flattened at its end on opposite sides to form parallel flats 38 and 39, the exact diametral dimension $d$ being preserved between the edges 41 and 42 of the flattened portion. In the relative positions of rod and clevis shown in Fig. 5, the clevis surrounding the flattened rod, the clevis and flattened rod have considerable clearance between them and do not touch at any point. Fig. 6 shows the same two parts, the rod 18 being rotated 90° from its Fig. 5 position and the flattened rod 34 being in the same position as shown in Fig. 5. The clevis, when it surrounds or embraces the flattened rod, now snugly fits the flattened rod, engaging the two edges 41 and 42 thereof. A bearing 40 is applied to the rod 18 to insure the requisite accuracy in indexing the turret, the rotary solenoid bearing not being relied on. An axial hole 45 and a dowel pin 45' are provided to secure rod 18 on the rotary solenoid shaft.

This locking device cannot stick, even when the temperature has greatly changed after the device has been locked and before it is unlocked. This is because any temperature expansion or shrinkage of the flattened rod is matched by an equal temperature expansion or shrinkage of the clevis, made of the same material so that the fit of the two parts is not affected.

The rotary solenoid 19 is so constructed that when it is energized and rotates rod 18 by 90° it also moves rod 18 axially by a small fraction of an inch. The shaft of the rotary solenoid is prolonged through the center of the solenoid, ending in a small disc 43. This disc is in contact with the operating pin 44 of switch 21, the pin 44 being urged toward the disc 43 and maintained at all times in contact therewith by an internal spring which is not visible in the drawing. The disc 43, when it moves axially toward the right as it does when the rotary solenoid is energized, presses pin 44 and actuates switch 21, closing its contacts. This position is shown in Fig. 5. The normal position in which the solenoid is deenergized and the switch contacts are open is shown in Fig. 6.

Figure 7:
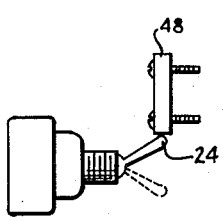
Figure 7 is a view taken on the line 7—7 of Fig. 3 showing the relation of the reversing switch to one of its operating blocks.

The camera is provided with the electrical reversing switch 24, Fig. 2, and the turret plate 13, Fig. 3, carries two similar blocks 47 and 48 which throw switch 24 from one position to the other position at the ends of the travel arc of the turret. Switch 24 is drawn superimposed on block 48 to indicate the mechanical relation at one end of the travel arc an instant after the reversing switch has been thrown. The relation just before operation is shown in Fig. 7.

The circuit for remote control of the camera turret rotation is shown in Fig. 8. A manually operated switch 49, Figs. 1 and 8, contains two three-position arms 51 and 52. The three normally-closed switches 22, 32, and 23, Fig. 2, are represented in the circuit diagram by contacts 22', 32' and 23'. In these switches the normal position is defined as the position of the switch when it is not in contact with cam 33, Figs. 3 and 4. The contacts 22', 32' and 23' are selectively connected on one side through switch arm 52 to one terminal 57 of a 28-volt source. The other sides of contacts 22', 32' and 23' are connected together and through the winding of rotary solenoid 19 to the other 28-volt terminal 57'. Coils 58 and 59 represent the windings of the two-phase, 400 c. p. s. motor 14, Fig. 1, the common terminal 61 being connected to a supply terminal 62. The motor phase winding terminals 63 and 64 are connected to end contacts 66 and 67 of manual switch 51 and are also connected to contacts 68 and 69 of the reversing switch 24, Figs. 2 and 8. The reversing switch arm 71 is connected to the middle contact 72 of manual switch arm 51. This arm 51 is connected to the power terminal 62' through switch contacts 21' of the solenoid-operated switch 21, Figs. 1 and 5.

When one of the lenses has been moved to the working position, such as the position of the lens socket 25, Fig. 3, the cam 33 has been placed at the position of associated switch 22 and its contacts 22', Fig. 8, are open. The manual switch 49 is in the position as depicted in Fig. 8 which operated turret to the described position. The solenoid 19 is deenergized and the clevis and flattened rod are in their normal position as depicted in Fig. 6, tightly locking the turret, and the solenoid-operated switch 21 is in its normal position with its contacts 21' open.

If the manual switch 49 now be moved to its other end position so that arm 51 makes contact with contact 67 and arm 52 makes contact with contact 74, a 28-volt circuit is established through closed switch contacts 23' of switch 23, Figs. 2 and 3, energizing solenoid 19, which rotates to the position shown in Fig. 5, releasing the flattened rod 34, Fig. 3. Operation of the solenoid also closes contacts 21' of switch 21, establishing the alternating power circuit through contact 67 and motor terminal 64. The motor rotates the turret clockwise as viewed in Fig. 3 until the cam 33 encounters the roller of switch 23, opening its contacts 23'. This occurs at a turret angle such that the clevis 20, Fig. 6, surrounds the flattened rod 37, Fig. 3. The opening of contacts 23' deenergizes solenoid 19 the attached clevis rod 18 immediately commencing to rotate under the influence of the self-contained retractile spring to turn from the position shown in Fig. 5 to that shown in Fig. 6. At the start of this motion, however, motor 14 is still energized and if the clevis 20 has not as yet attained exact registry with the flattened rod 34 and mechanical interference occurs, the turret and flattened rod are motor-driven toward exact registry. When the solenoid armature has executed almost all of its 90° motion the switch 21 is released so that its contacts 21' are opened. Any further registration motion is secured through motor coast and through the wedging action of the clevis as it rotates under motivation of the retractile spring.

In the operation of the registration and locking action just described, it has been found that the adjustments of the several parts and components are not at all critical, and that the registration and locking action is sure and positive.

In moving the turret from the end position which was attained by putting the manual switch on its end contacts 66 and 66' to the middle position, the motor turns in one direction, and in moving from the other turret end position to the same middle position the motor turns in the opposite direction. In order to give these instructions for opposite motor rotations it is necessary to provide the reversing switch 24. This switch is operated at the end positions just before the turret comes to rest. For example, when the turret is moved to the end position indicated in Fig. 3, just before it attains that position block 48 moves switch 24 so that its arm 71, Fig. 8, makes contact with contact 69. If next the manual switch 49 be put on its middle position, the motor is energized in its reverse direction through switch arm 51, contact 72, arm 71 and contact 69 to motor terminal 64. The turret is stopped at its middle position when cam 33, Figs. 3 and 4, actuates switch 32, opening its contact 32', Fig. 8. If, however, the position of the turret is at the other end when the order is given to move to the central position, block 47 will have moved reversing switch 24 to its opposite position and upon closure of contacts 21' the motor circuit will be completed through arm 51, contact 72, arm 71 and contact 68 to motor terminal 63, rotating the motor in the proper direction which is counterclockwise in Fig. 3.

What is claimed is:

1. A rotatable lens turret camera comprising, a camera body, a rotatable lens turret, a motor for rotating said turret to a selected one of a plurality of lens positions, a rotary solenoid fastened to said camera body having a rotary shaft provided with a slotted end portion extending towards said lens turret, a plurality of rods each having a diameter equal to the width of the slot in said solenoid shaft and each being provided with a flattened end portion, said rods being affixed to said lens turret in such positions and orientations as to engage with the slot in said solenoid shaft at locations of said lens turret corresponding to the lens positions thereof and to freely pass through said slot in the energized angular position of said solenoid but to be held in locked embrace thereby in the deenergized angular position of said solenoid, means carried by said camera for deenergizing said solenoid only at preselected ones of said lens positions, and means energizing said motor only during the period of energization of said solenoid.

2. A rotatable lens turret camera comprising, a cemera body, a rotatable lens turret, a motor for rotating said turret to a selected one of a plurality of lens positions, a rotary solenoid fastened to said camera body having a rotary shaft provided with a slotted end portion extending towards said lens turret, a plurality of rods each having a diameter equal to the width of the slot in said solenoid shaft and each being provided with a flattened end portion, said rods being affixed to said lens turret in such positions and orientations as to engage with the slot in said solenoid shaft at angular locations of said lens turret corresponding to the lens positions thereof and to freely pass through said slot in the energized angular position of said solenoid but to be held in locked embrace thereby in the deenergized angular position of said solenoid, a plurality of indexing switches equal in number to the number of lens positions carried by said camera body, cam means on said lens turret for actuating said indexing switches to open position at the lens positions of said lens turret, a remote selector switch for selectively connecting an energizing source in series with said solenoid and a selected one of said indexing switches, and means operated by said solenoid in its energized position for energizing said motor.

3. A rotatable lens turret camera comprising, a camera body, a rotatable lens turret, a reversible motor for rotating said turret to a selected one of a plurality of lens positions, a rotary solenoid attached to said body, said solenoid including a shaft rotated between energized and deenergized angular positions, said shaft having a slotted end portion projecting toward said turret, an individual flattened rod on said turret at each lens position, said flattened rods projecting towards said camera body and cooperating with the slotted end portion of said shaft to pass freely therethrough in one angular position of said shaft but held in locked embrace thereby in the other angular position of said shaft, a plurality of switches each of which is located at one of a plurality of lens positions of said turret, cam means cooperating with said switches to open the circuit of said rotary solenoid, a normally open switch in and controlling the circuit of said motor, said switch being positioned to be closed by said rotary solenoid when in its energized condition, a manual switch connected to select individual ones of said switches at the plurality of lens positions and for selecting the direction of rotation of said motor, and a reversing switch operated by said turret at its terminal positions of rotation and cooperating with said manual switch to control the direction of rotation of said motor.

References Cited in the file of this patent

UNITED STATES PATENTS

| | | |
|---|---|---|
| 2,307,479 | Annick | Jan. 5, 1943 |
| 2,496,880 | Leland | Feb. 7, 1950 |
| 2,694,352 | Babbs | Nov. 16, 1954 |
| 2,717,544 | Messenger et al. | Sept. 13, 1955 |